United States Patent
Kim et al.

(10) Patent No.: US 12,135,726 B2
(45) Date of Patent: Nov. 5, 2024

(54) METHOD FOR GENERATING IDENTIFICATION ID, AND APPARATUS IMPLEMENTING THE SAME METHOD

(71) Applicant: SAMSUNG SDS CO., LTD., Seoul (KR)

(72) Inventors: Jae Hong Kim, Seoul (KR); Kwang Jae Lee, Seoul (KR); Gyu Haing Kang, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 168 days.

(21) Appl. No.: 17/510,664

(22) Filed: Oct. 26, 2021

(65) Prior Publication Data
US 2022/0129458 A1  Apr. 28, 2022

(30) Foreign Application Priority Data

Oct. 26, 2020 (KR) .................. 10-2020-0139326

(51) Int. Cl.
| | | |
|---|---|---|
| G06F 7/00 | (2006.01) | |
| G06F 16/22 | (2019.01) | |
| G06F 16/23 | (2019.01) | |
| G06F 16/2458 | (2019.01) | |

(52) U.S. Cl.
CPC .......... *G06F 16/2474* (2019.01); *G06F 16/22* (2019.01); *G06F 16/2322* (2019.01)

(58) Field of Classification Search
CPC .. G06F 16/2474; G06F 16/22; G06F 16/2322; G06F 16/2291; H04L 61/2571; H04L 67/51

USPC .......... 707/692, 770, 781, 803, 812, 999.01, 707/999.2
See application file for complete search history.

(56) References Cited

U.S. PATENT DOCUMENTS

| | | |
|---|---|---|
| 6,662,191 B1 | 12/2003 | Cherniavsky et al. |
| 8,255,490 B1 | 8/2012 | Porter et al. |
| 8,543,971 B2 | 9/2013 | Jalaldeen et al. |
| 10,484,410 B2 | 11/2019 | Fenoglio et al. |
| 2008/0244317 A1* | 10/2008 | Yano .............. G06F 11/263 714/E11.178 |
| 2009/0172012 A1 | 7/2009 | Chellam et al. |
| 2016/0004984 A1 | 1/2016 | Williams |

FOREIGN PATENT DOCUMENTS

| | | | | |
|---|---|---|---|---|
| CN | 108089916 A | * | 5/2018 | ............. G06F 9/465 |
| JP | 2009245282 A | * | 10/2009 | |
| WO | WO-2019164293 A1 | * | 8/2019 | ......... G06F 16/2228 |

OTHER PUBLICATIONS

Rajeev Singh, "Generating unique IDs a distributed environment at high scale." Callicoder, 2018.

* cited by examiner

*Primary Examiner* — Md I Uddin
(74) *Attorney, Agent, or Firm* — Sughrue Mion, PLLC

(57) ABSTRACT

A method performed by a computing device for generating an identification identifier (ID) according to an embodiment of the present disclosure includes obtaining an instance ID for identifying each of a plurality of service instances, and generating an identification ID for identifying a data item sequentially generated by the respective service instance. The identification ID may include the instance ID, a sequence number, and generation time information.

15 Claims, 12 Drawing Sheets

METHOD FOR GENERATING IDENTIFICATION ID, AND APPARATUS IMPLEMENTING THE SAME METHOD

CROSS REFERENCE TO RELATED APPLICATIONS AND CLAIM OF PRIORITY

This application claims the benefit of Korean Patent Application No. 10-2020-0139326, filed on Oct. 26, 2020, in the Korean Intellectual Property Office, the disclosure of which is incorporated herein by reference in its entirety.

BACKGROUND

1. Field

The present invention relates to a method for generating an identification ID, and an apparatus for implementing the same, and more particularly, to a method for generating an identification ID that can identify data generated when a service such as an application is executed, and an apparatus for implementing this.

2. Description of the Related Art

The microservice architecture is to provide services by dividing into the functions of small module unit that can be executed independently, and generates and manages data required by each service.

In general, when new data is generated in all services, a unique ID that can identify data is generated, and the generated ID can be used to refer to data between each service.

In the case of existing services, a universally unique identifier (UUID) is mainly used to generate a unique ID. However, this has a problem in that the size of the data is too large and characters are included, which reduces readability and degrades the performance of the database.

In addition, since the ID generation and management subject is the central server, the performance is lowered because access to the central server is required every time an ID is generated. And, it becomes a single point of failure (SPOF), in which if some components of the central server do not work, the whole system is stopped, so the reliability of the service is lowered.

In addition, since each service generates an ID by generating and managing the sequence number in each service itself, there is a problem in that it cannot ensure uniqueness across the entire service.

Therefore, an ID generation method that ensure uniqueness across the entire service and does not affect the performance of the database is required. In addition, there is a need for a method that can ensure the uniqueness of the ID even when a lot of data is generated in a short time.

SUMMARY

The technical problem to be solved by the present invention is to provide a method for generating an identification ID that can ensure uniqueness across the entire service when generating an ID for identifying data generated by each of a plurality of service instances, and an apparatus for implementing the same.

Another technical problem to be solved by the present invention is to provide a method for generating an identification ID that can ensure performance and reliability when generating an ID for identifying data generated by each service instance, and an apparatus for implementing the same.

The technical problems of the present invention are not limited to the technical problems mentioned above, and other technical problems not mentioned will be clearly understood by those skilled in the art from the description below.

According to an aspect of the inventive concept, there is provided a method performed by a computing device for generating an identification ID. The method comprises obtaining an instance ID for identifying each of a plurality of service instances, and generating an identification ID for identifying a data item sequentially generated by the respective service instance, wherein the identification ID includes the instance ID, a sequence number, and time information.

The method may further comprise generating an instance ID for identifying the respective service instance at a time when each of the plurality of service instances is initially started, storing the generated instance ID and generation time information in a database server, and storing the respective instance ID in an internal memory of the respective service instance.

Obtaining an instance ID for identifying each of the plurality of service instances may comprise obtaining an instance ID stored in the internal memory.

Storing in the database server may comprise storing identification information of the respective service instance together with the instance ID and generation time information in a database server, wherein obtaining an instance ID for identifying each of the plurality of service instances comprises, obtaining an instance ID stored in the database server by using identification information of the respective service instance based on determination that the respective service instance is restarted.

The identification information may include at least one of an IP address of a device, on which the respective service instance is installed, and path information, indicating a location of a directory where the respective service instance is installed.

The method may further comprise updating generation time information corresponding to the instance ID stored in the database server at a preset time period.

The method may further comprise discarding an instance ID, in which a predetermined time has elapsed based on the generation time information, among a plurality of instance IDs previously stored in the database server, wherein storing in the database server comprises, reusing the discarded instance ID.

The instance ID has a first number of digits and the sequence number has a second number of digits, wherein the method further comprising: increasing the first number by 1 and decreasing the second number by 1 based on determination that all values expressible by the first number of digits are exhausted.

The sequence number may have a second number of digits, wherein generating the identification ID comprises, increasing the time information by a predetermined unit time based on determination that all values expressible by the second number of digits are exhausted.

The time information may be a timestamp expressed by a number having preset digits.

According to an aspect of the inventive concept, there is provided a computer readable non-transitory recording medium storing a computer program for causing a computer to perform the method.

According to an aspect of the inventive concept, there is provided an apparatus for generating an identification ID. The apparatus comprises a communication unit for communicating with an external device, a storage unit, an instance ID obtaining module for obtaining an instance ID for identifying each of a plurality of service instances, and at least one processor including an identification ID generation module for generating an identification ID for identifying a data item sequentially generated by the respective service instance, wherein the identification ID includes the instance ID, a sequence number, and time information.

The processor may generate an instance ID for identifying the respective service instance at a time when each of the plurality of service instances is initially started, controls the communication unit to transmit the generated instance ID and generation time information to a database server, controls to store the respective instance ID in the storage unit.

The instance ID obtaining module may obtain an instance ID stored in the storage unit.

The processor may control the communication unit to transmit identification information of the respective service instance together with the instance ID and generation time information to the database server, wherein the instance ID obtaining module obtains an instance ID stored in the database server by using identification information of the respective service instance based on determination that the respective service instance is restarted.

The identification information may include at least one of an IP address of a device, on which the respective service instance is installed, and path information indicating a location of a directory where the respective service instance is installed.

The processor may control the communication unit to update generation time information corresponding to the instance ID stored in the database server at a preset time period and transmit it to the database server.

The processor may transmit a request to discard an instance ID, in which a predetermined time has elapsed based on the generation time information, among a plurality of instance IDs previously stored in the database server, and reuses the discarded instance ID.

The instance ID may have a first number of digits and the sequence number may have a second number of digits, wherein the processor increases the first number by 1 and decreases the second number by 1 based on determination that all values expressible by the first number of digits are exhausted.

The time information may be a timestamp expressed by a number having preset digits.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
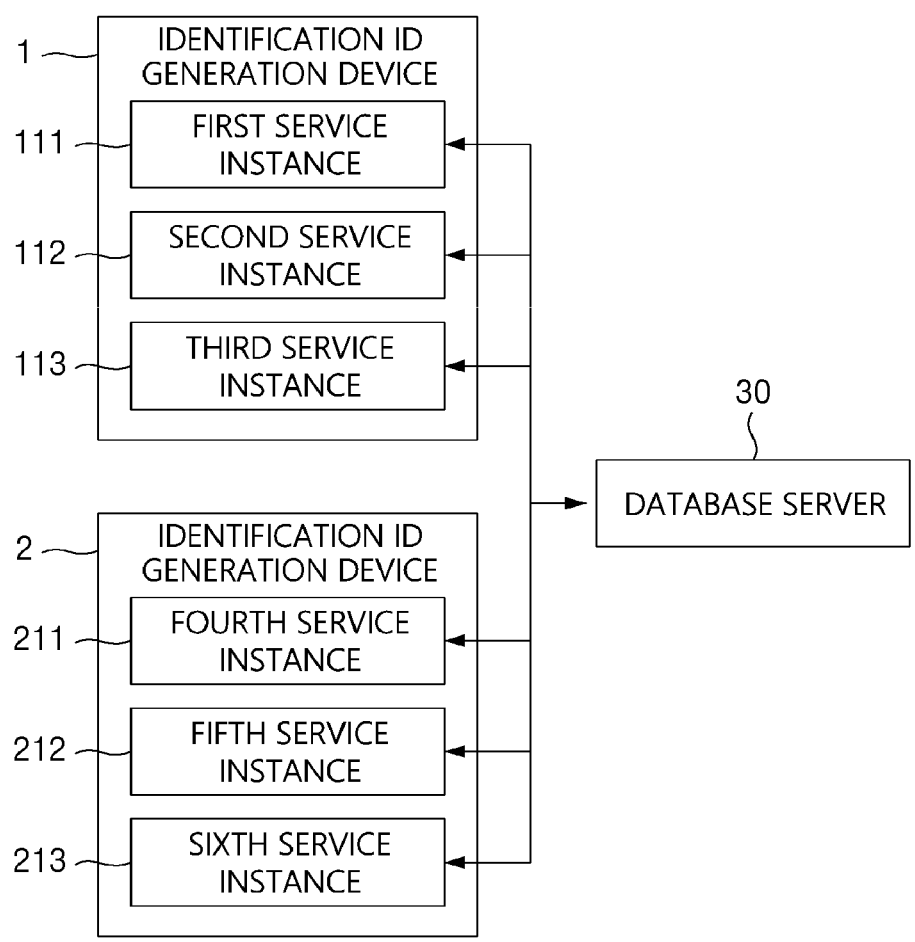
FIG. 1 is a block diagram of an identification ID generation system according to an embodiment of the present invention.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 is a block diagram of an identification ID generation system according to an embodiment of the present invention. Referring to FIG. 1, the system according to an embodiment of the present invention includes a plurality of identification ID generation devices 1 and 2, and a database server 30.

Each of the plurality of identification ID generation devices 1, 2 is a device that provides an environment, in which at least one service instance 111, 112, 113, 211, 212, 213 can be installed and executed, and it may be implemented, for example, as a server device, or a computing device such as a PC, a laptop, a smart phone, a tablet, and the like. In this case, each of the plurality of service instances 111, 112, 113, 211, 212 and 213 may correspond to, for example, each service constituting the microservice architecture or may correspond to an application service. In addition, each of the plurality of service instances 111, 112, 113, 211, 212 and 213 may include the same function.

As shown, a plurality of service instances 111, 112, and 113 may be installed in the identification ID generation device 1. The identification ID generation device 1 generates each instance ID at the time when each service instance 111, 112, and 113 is initially started, and registers it in the database server 30. In this case, the identification ID generation device 1 may store each generated instance ID in an internal memory of each service instance.

The database server 30 may be implemented as a separate DB server connected to the plurality of identification ID generation devices 1 and 2 through a network, and is not limited to a specific type of DB server.

The database server 30 receives each instance ID generated when each of the plurality of service instances 111, 112, 113, 211, 212, and 213 installed in each of the plurality of identification ID generation devices 1 and 2 is initially started, and stores it.

The identification ID generation device 1 generates an identification ID for identifying a data item generated when each service instance 111, 112, and 113 is executed, wherein the identification ID includes the configuration of an instance ID, a sequence number, and time information.

As an embodiment, the identification ID generation device 1 may generate each identification ID by using the instance ID stored in the internal memory of the corresponding service instance when the data item is generated by each service instance 111, 112, and 113. As another embodiment, the identification ID generation device 1 may generate each identification ID by using the instance ID registered in the database server 30 when each service instance 111, 112, 113 is restarted.

As described above, by the configuration of the system according to the embodiment of the present invention, an ID for identifying data generated by a service instance may be generated, and the ID generated in this way can ensure uniqueness across the entire service. In addition, the performance of the system can be ensured by reducing the dependence on the central database server.

Figure 2:
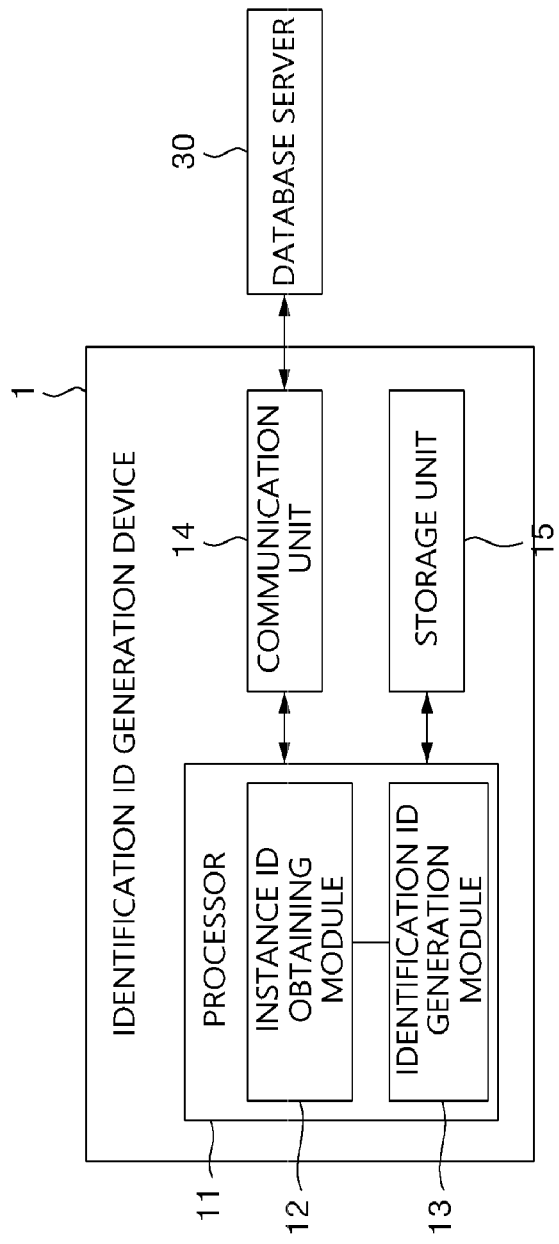
FIG. 2 is a block diagram illustrating a configuration of an identification ID generation device according to an embodiment of the present invention.

FIG. 2 is a block diagram illustrating a configuration of an identification ID generation device according to an embodiment of the present invention. Referring to FIG. 2, the identification ID generation device 1 according to an embodiment of the present invention may include a communication unit 14, a storage unit 15, and a processor 11, and may be connected to a database server 30 through the communication unit 14.

The processor 11 includes an instance ID obtaining module 12 and an identification ID generation module 13, and may further include an instance ID generation module (not shown). As an embodiment, the instance ID obtaining module 12, the identification ID generation module 13, and the instance ID generation module (not shown) may exist in the form of a library inside each service instance.

The instance ID generation module (not shown) generates an instance ID for identifying each service instance at the time when each of the plurality of service instances installed in the identification ID generation device 1 is initially started.

The processor 11 controls the communication unit 14 to transmit each instance ID generated by the instance ID generation module (not shown), generation time information of each instance ID, and identification information of each service instance to the database server 30. Here, the generation time information may be used as information to identify when each instance ID is generated. In addition, the identification information includes at least one of an IP address of a device, in which each service instance is installed, and directory information, in which each service instance is installed, and may be used as information for distinguishing each service instance together with an instance ID.

In addition, the processor 11 controls to store each instance ID in the storage unit 15. As an embodiment, the processor 11 may store each instance ID in an internal memory of each service instance.

The instance ID obtaining module 12 obtains an instance ID for identifying each of a plurality of service instances.

As an embodiment, the instance ID obtaining module 12 may obtain the instance ID stored in the storage unit 15 or the internal memory of each service instance from the time each service instance is initially started until it is restarted. When each instance ID is stored in the internal memory of each service instance, information about the instance ID stored in the internal memory may disappear when each service instance is restarted.

As an embodiment, the instance ID obtaining module 12 may obtain the instance ID stored in the database server 30 by using the identification information of each service instance since the instance ID no longer exists in the internal memory when each service instance is restarted. For example, when the service instance is restarted, the instance ID obtaining module 12 may obtain the instance ID registered in the database server 30 by using the IP address of the device, in which the corresponding service instance is installed and directory information installed.

The identification ID generation module 13 generates an identification ID for identifying data items that are sequentially generated by each service instance. The identification ID generation module 13 may use the instance ID obtained by the instance ID obtaining module 12 to generate the identification ID. In this case, the instance ID may be obtained from the internal memory of each service instance, or may be obtained from the database server 30 by using identification information of the corresponding service instance when the instance is restarted.

Figure 8:
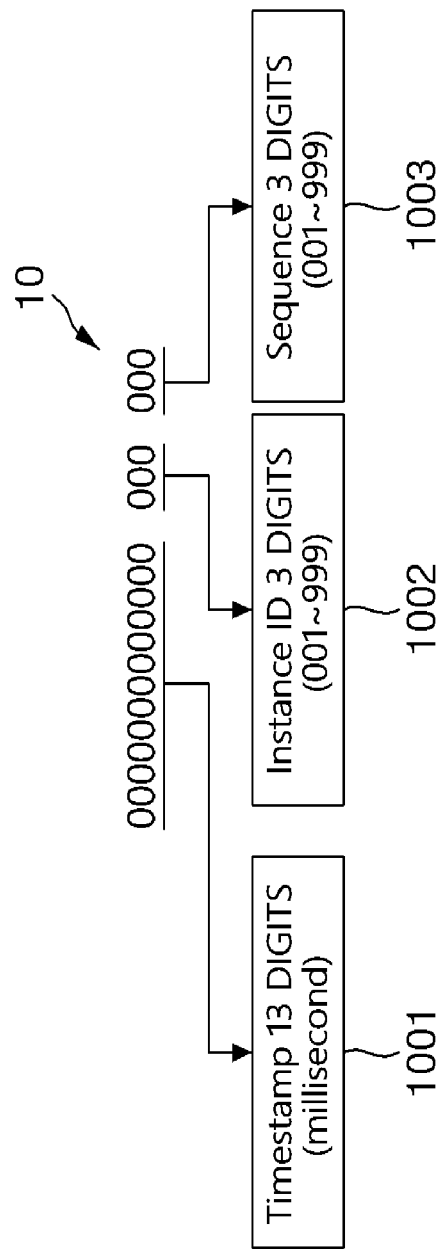
FIG. 8 is an example illustrating a configuration of an identification ID according to some embodiments of the present invention.

As an embodiment, as shown in FIG. 8, the identification ID 10 may be expressed as an integer of, for example, 19 digits, and may include time information 1001, an instance ID 1002, and a sequence number 1003. Here, the time information 1001 may be expressed as a timestamp in the unit of millisecond of a 13-digit number, and the instance ID 1002 may be expressed as a 3-digit number from 001 to 999. In addition, the sequence number 1003 is expressed as a 3-digit number from 001 to 999, and a value incremented by 1 whenever a new identification ID is generated in the corresponding service instance may be used.

As an embodiment, when generating the identification ID, the identification ID generation module 13 may generate the identification ID by sequentially listing the time information 1001, the instance ID 1002, and the sequence number 1003 as in the example of FIG. 8, or changing the listing order.

As an embodiment, the processor 11 may control the communication unit 14 to update the generation time information of the instance ID registered in the database server 30 at a preset time period and transmit it to the database server 30. As such, by periodically updating the generation time information of the instance ID being used in each service instance, if each service instance is deleted thereafter, the instance ID used in the corresponding service instance is recycled to be usable in other service instances.

As an embodiment, the processor 11 may transmit a request to discard an instance ID, in which predetermined time has elapsed based on generation time information, among a plurality of instance IDs registered in the database server 30, and reuse the discarded instance ID. Accordingly, it is possible to reuse the instance ID, in which predetermined time has elapsed based on the generation time information of the existing instance IDs at the time of generating a new instance ID.

As an embodiment, the processor 11 may generate the instance ID by increasing the first length by 1 when all values expressible by the first length are used when generating the instance ID. In this case, in response to the increase in the first length of the instance ID by 1, the second length of the sequence number may be decreased by 1.

As an embodiment, the identification ID generation module 13 may generate the identification ID by increasing the time information by predetermined unit time and reusing the previously used sequence number when all values expressible by the second length are used, when generating the sequence number. For example, when more than 999 identification IDs are generated per one millisecond, a large number of sequence numbers should be generated in a short time. In this case, the identification ID can be generated by increasing the time information (timestamp) by 1 ms at the moment when the sequence number reaches 999, and reusing the sequence number from 001.

As described above, by the configuration of the identification ID generation device 1 according to the embodiment of the present invention, an ID that can ensure the uniqueness across the entire service and does not affect the performance of the database may be generated so that data items generated by each service instance can be identified. In addition, even when a lot of data is generated in a short time by each instance, the uniqueness of the ID can be ensured.

Figure 3:
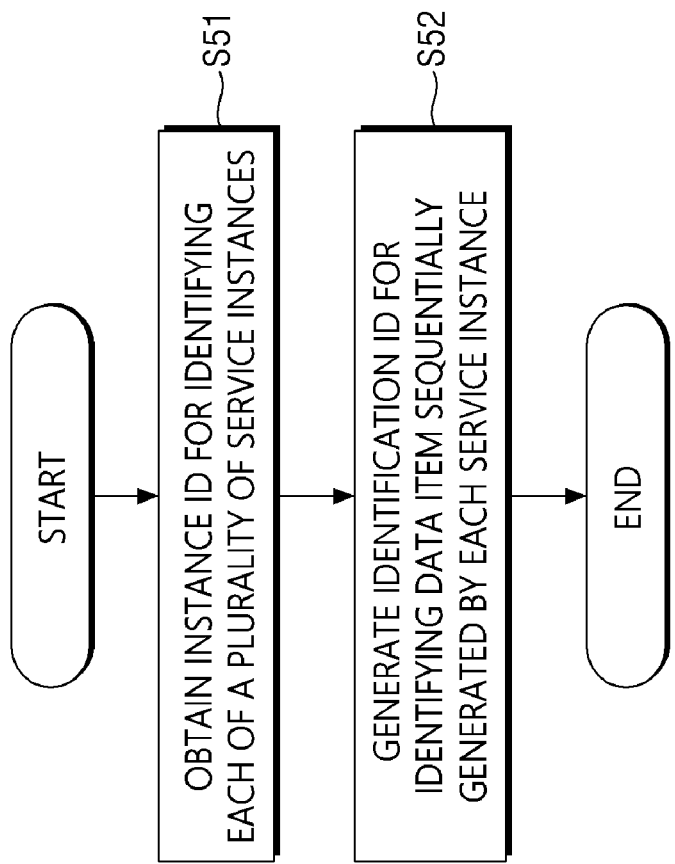
FIGS. 3 to 5 are flowcharts for describing a method of generating an identification ID according to another embodiment of the present invention.
Figure 4:
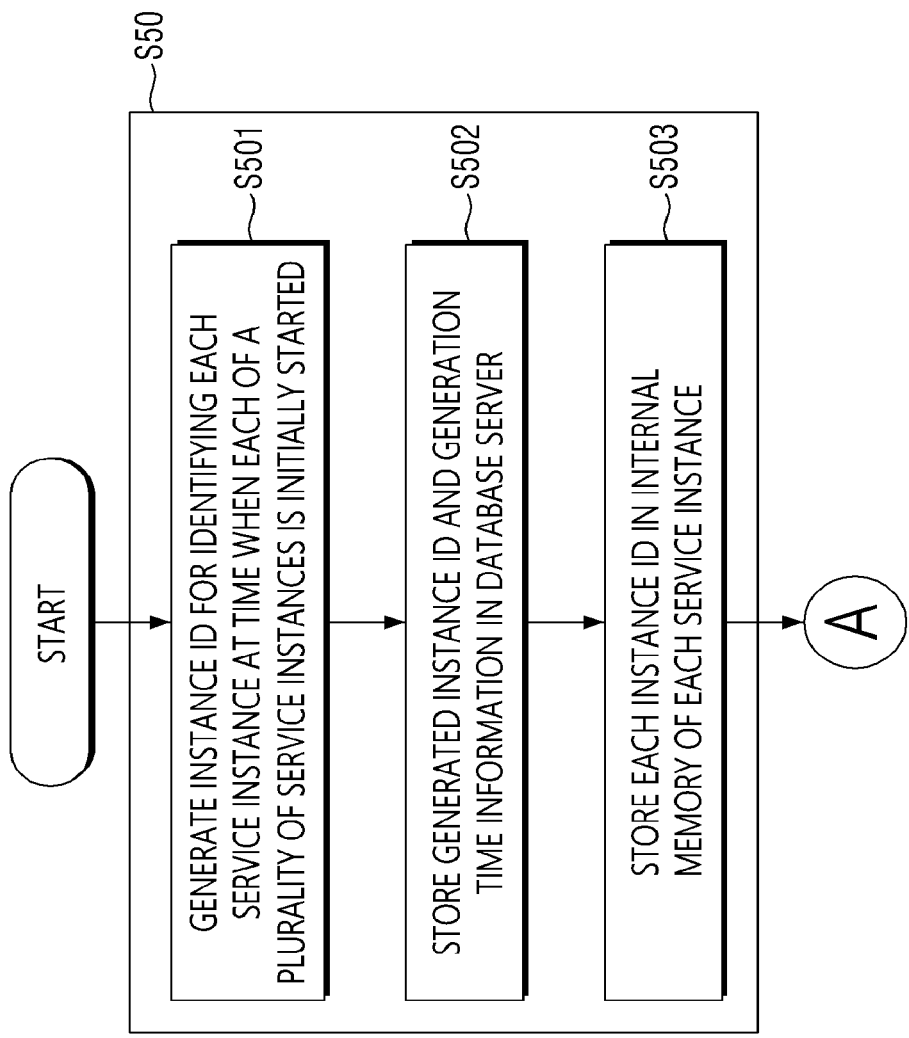
Figure 5:
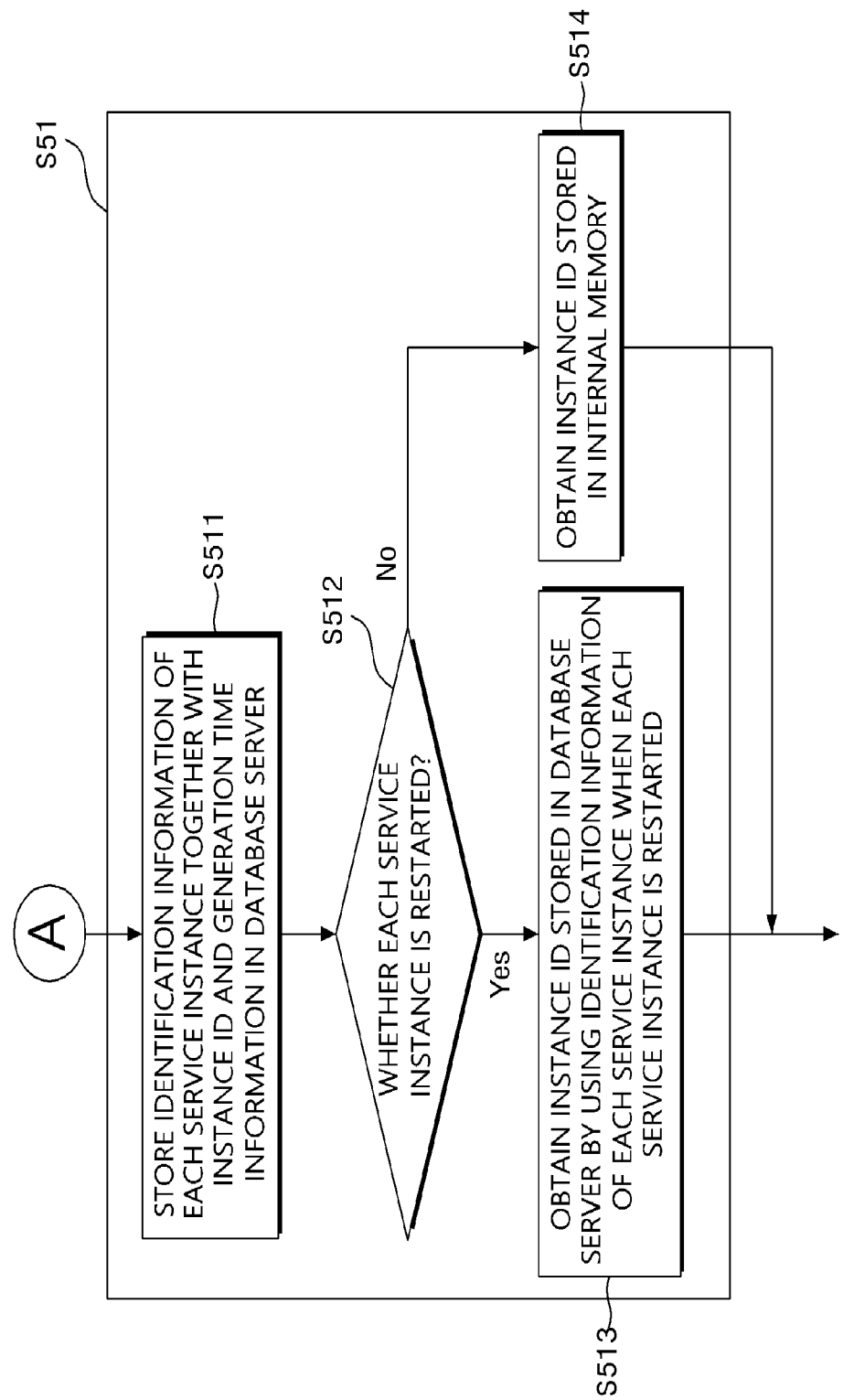

FIGS. 3 to 5 are flowcharts for describing a method of generating an identification ID according to another embodiment of the present invention.

The identification ID generation method according to an embodiment of the present invention may be executed by the computing device 100, for example, may be executed by the identification ID generation device 1. The computing device 100 executing the method according to the present embodiment may be a computing device having an application program execution environment. It should be noted that the description of the subject performing some operations included in the method according to the embodiment of the present invention may be omitted, and in this case, the subject is the computing device 100.

Referring to FIG. 3, first, in operation S51, an instance ID for identifying each of a plurality of service instances is obtained.

As an embodiment, operation S50 may be performed before operation S51. In operation S50, an instance ID for identifying each service instance is generated and registered.

Referring to FIG. 4, operation S50 includes operations S501 to S503. In operation S501, an instance ID for identifying each service instance is generated at the time when each of the plurality of service instances is initially started.

In operation S502, the instance ID generated in operation S50 and the generation time information indicating the time, at which the instance ID is generated, are stored in the database server 30.

In operation S503, each instance ID is stored in the internal memory of the respective service instance.

As an embodiment, referring to FIG. 5, operation S51 may further include operations S511 to S514.

In operation S511, identification information of each service instance is stored in the database server 30 together with the instance ID and generation time information.

In operation S512, it is determined whether each service instance is restarted, and if it is determined that it is restarted, in operation S513, the instance ID stored in the database server 30 is obtained using the identification information of each service instance. If it is determined in operation S512 that it has not been restarted, in operation S514, the instance ID stored in the internal memory of the service instance is obtained.

Finally, in operation S52, an identification ID for identifying a data item sequentially generated by each service instance is generated. In this case, the identification ID may include an instance ID, a sequence number, and time information, and the time information may be a timestamp expressed by a number of preset digits.

As described above, by the identification ID generation method according to the embodiment of the present invention, a unique ID capable of identifying a data item generated by a service instance may be generated. In addition, it is possible to ensure performance and reliability by reducing the dependency on the central database server when generating the identification ID.

Figure 6:
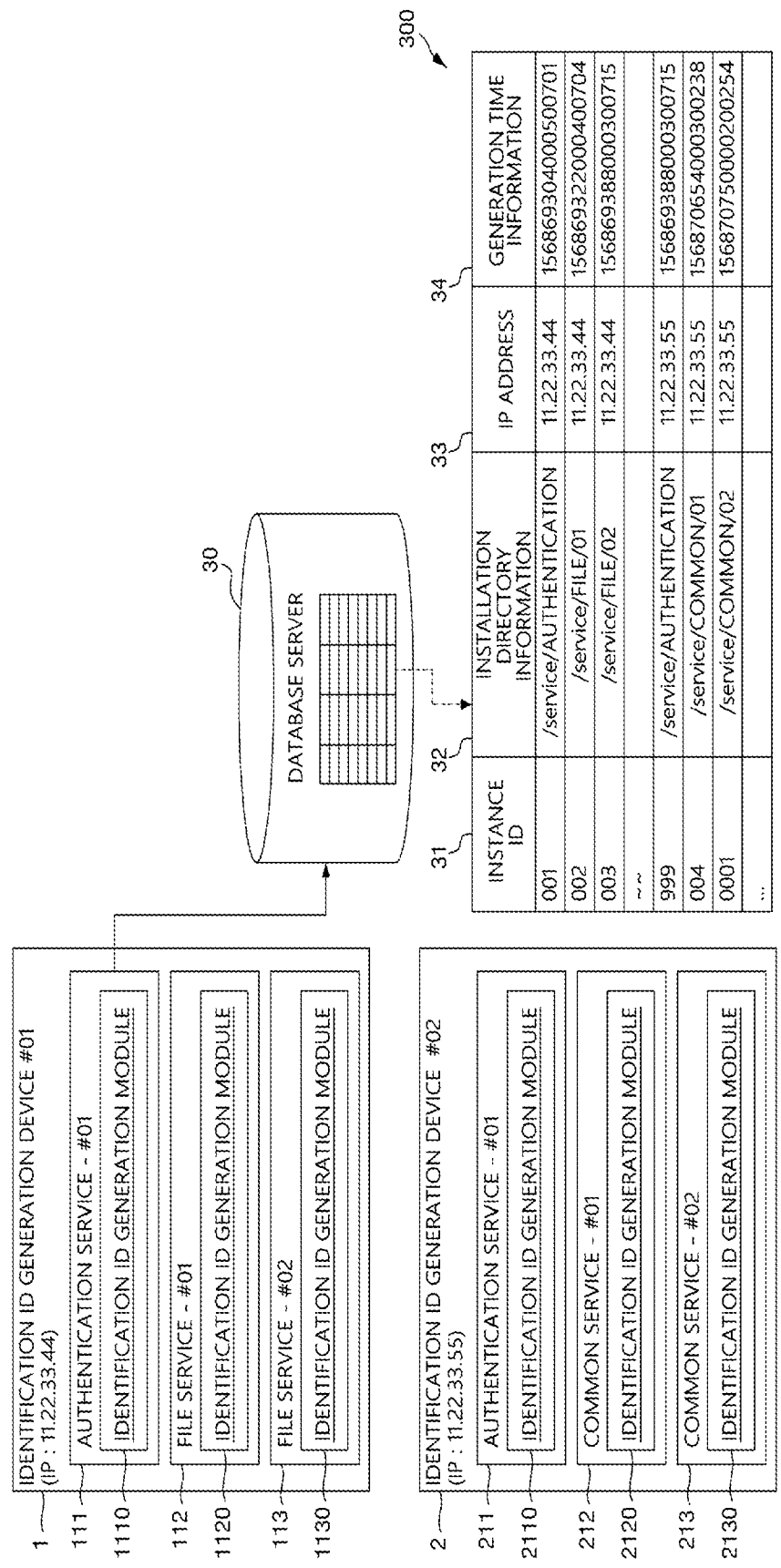
FIG. 6 is an example of generating and registering an instance ID in each service instance according to some embodiments of the present invention.

FIG. 6 is an example of generating and registering an instance ID in each service instance according to some embodiments of the present invention. Referring to FIG. 6, each of the plurality of identification ID generation devices 1 and 2 provides an environment, in which a plurality of service instances 111, 112, 113, 211, 212 and 213 are installed and executed. Here, each service instance may include an application.

In the illustrated example, a plurality of service instances such as, for example, the authentication service 111, the first file service 112, and the second file service 113 may be installed and executed in the first identification ID generation device 1. Also, a plurality of service instances such as the authentication service 211, the first common service 212, and the second common service 213 may be installed and executed in the second identification ID generation device 2.

The respective identification ID generation module 1110, 1120, 1130 exists in each of the service instances 111, 112, 113 installed in the first identification ID generation device 1, and the respective identification ID generating module 2110, 2120, 2130 exists in each of the service instances 211, 212, 213 installed in the second identification ID generation device 2. At this time, each identification ID generation module 1110, 1120, 1130, 2110, 2120, 2130 may be stored in the form of a library in each corresponding service instance 111, 112, 113, 211, 212, 213.

As an embodiment, each of the identification ID generation modules 1110, 1120, 1130, 2110, 2120, 2130 existing in each service instance 111, 112, 113, 211, 212, 213 may generate an identification ID capable of identifying each data item generated when the data item is generated by each service instance 111, 112, 113, 211, 212, 213.

At this time, the identification ID may be generated using an instance ID that can identify each service instance, and the instance ID may be generated at the time when each instance is first started, stored and managed in the database server 30.

The database server 30 stores information about each instance ID in one table 300, and the table 300 is a field for storing information, and may include, for example, fields such as the instance ID 31, installation directory information 32, IP address 33, and generation time information 34.

Here, an instance ID generated at the time when each service instance is initially started may be stored in the instance ID 31 field. The instance ID may be expressed as, for example, a 3-digit number from 001 to 999.

The generation time information 34 field may store information about generation time, which is the time when the instance ID is first generated, or update time, which is the time when the instance ID is updated.

Figure 7:
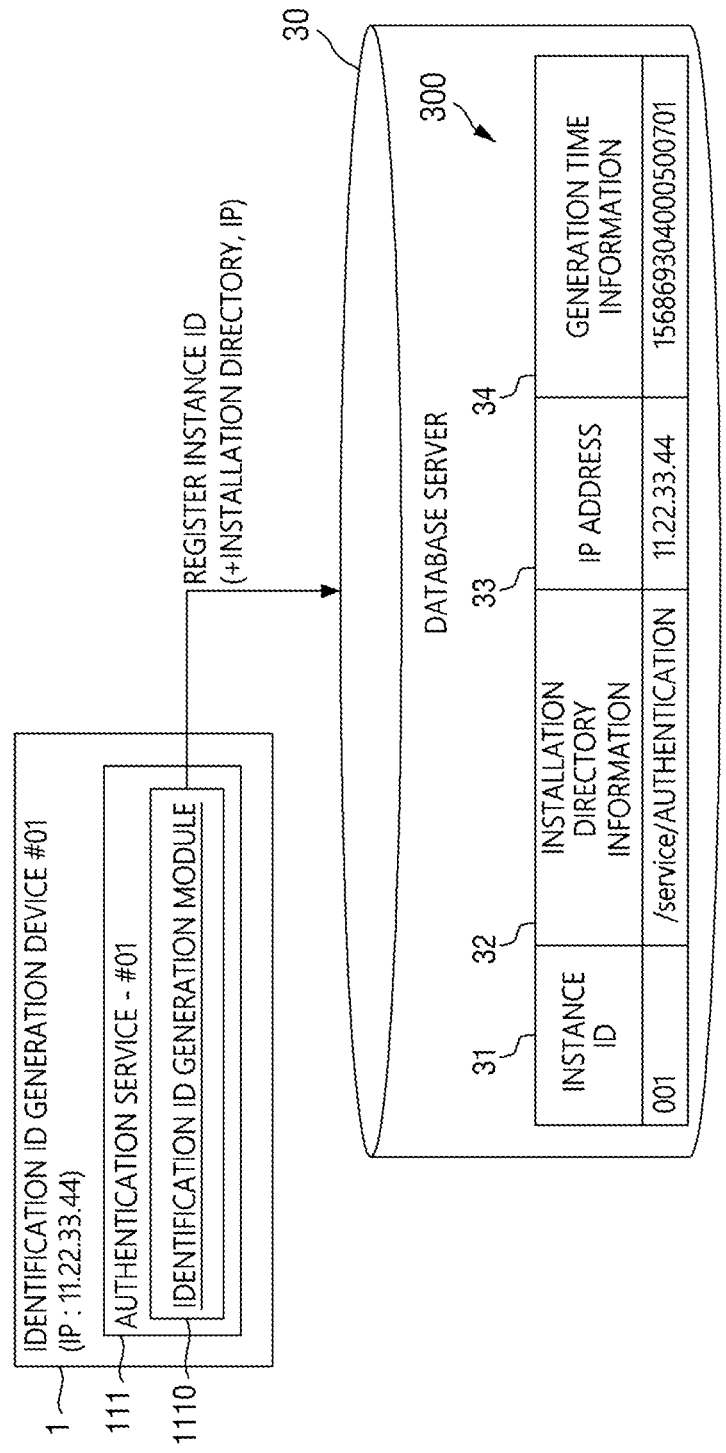
FIG. 7 is an example of registering identification information of a service instance together when registering an instance ID according to some embodiments of the present invention.

Referring to FIG. 7, the IP address of the device, in which the instance 111 is installed, and information about the installation directory may be stored as identification information for identifying the corresponding service instance 111 in the installation directory information 32 and IP address 33 fields of the table 300. As described above, the corresponding service instance 111 may be distinguished from other service instances by using the information stored in the installation directory information 32 and the IP address 33 fields. In addition, when the corresponding service instance 111 is restarted, the corresponding instance ID can be inquired and used by using the information stored in the installation directory information 32 and the IP address 33 fields in generating the identification ID.

According to the embodiment of the present invention as described above, by registering and managing the instance ID generated in each service instance, identification information, and generation time information in the central database server, an identification ID may be generated by referring to information stored in the database server when the instance is restarted.

Figure 9:
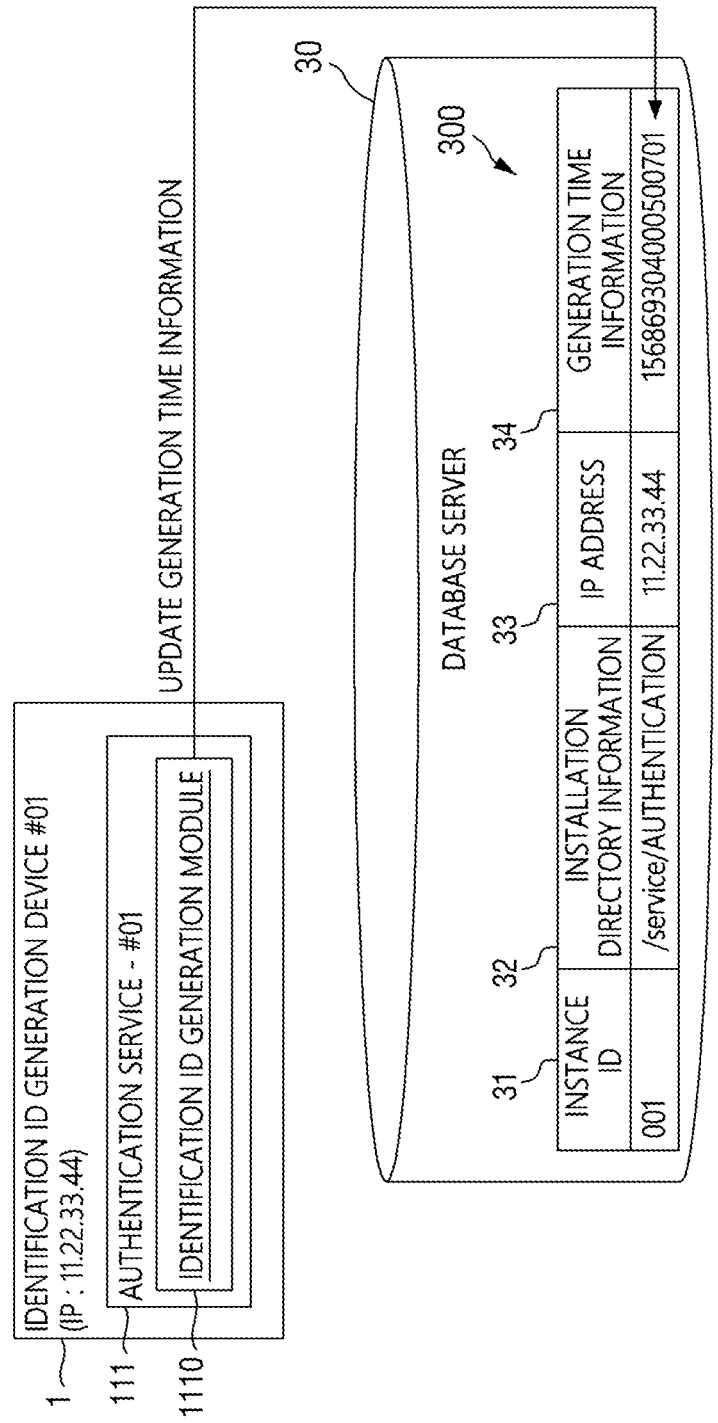
FIG. 9 is an example of updating generation time information of an instance ID in use according to some embodiments of the present invention.

FIG. 9 is an example of updating generation time information of an instance ID in use according to some embodiments of the present invention. Referring to FIG. 9, the first identification ID generation device 1 may store information about the instance ID generated when the authentication service 111 is initially started and the generated time in the instance ID 31 and generation time information 34 fields in the table 300 existing in the database server 30.

As an embodiment, the identification ID generation module 1110 existing in the authentication service 111 may periodically update information stored in the generation time information 34 field of the table 300. As an example, the identification ID generation module 1110 periodically changes the generation time information corresponding to the instance ID '001' to confirm that '001' is continuously being used.

As an embodiment, an instance ID, in which a predetermined time has elapsed based on the generation time information stored in the table 300 at the time of registering the instance ID for the new instance, may be reused.

According to the embodiment of the present invention as described above, it is possible to provide a method for recycling an unused instance ID by periodically updating the generation time information of an instance ID in use.

Figure 10:
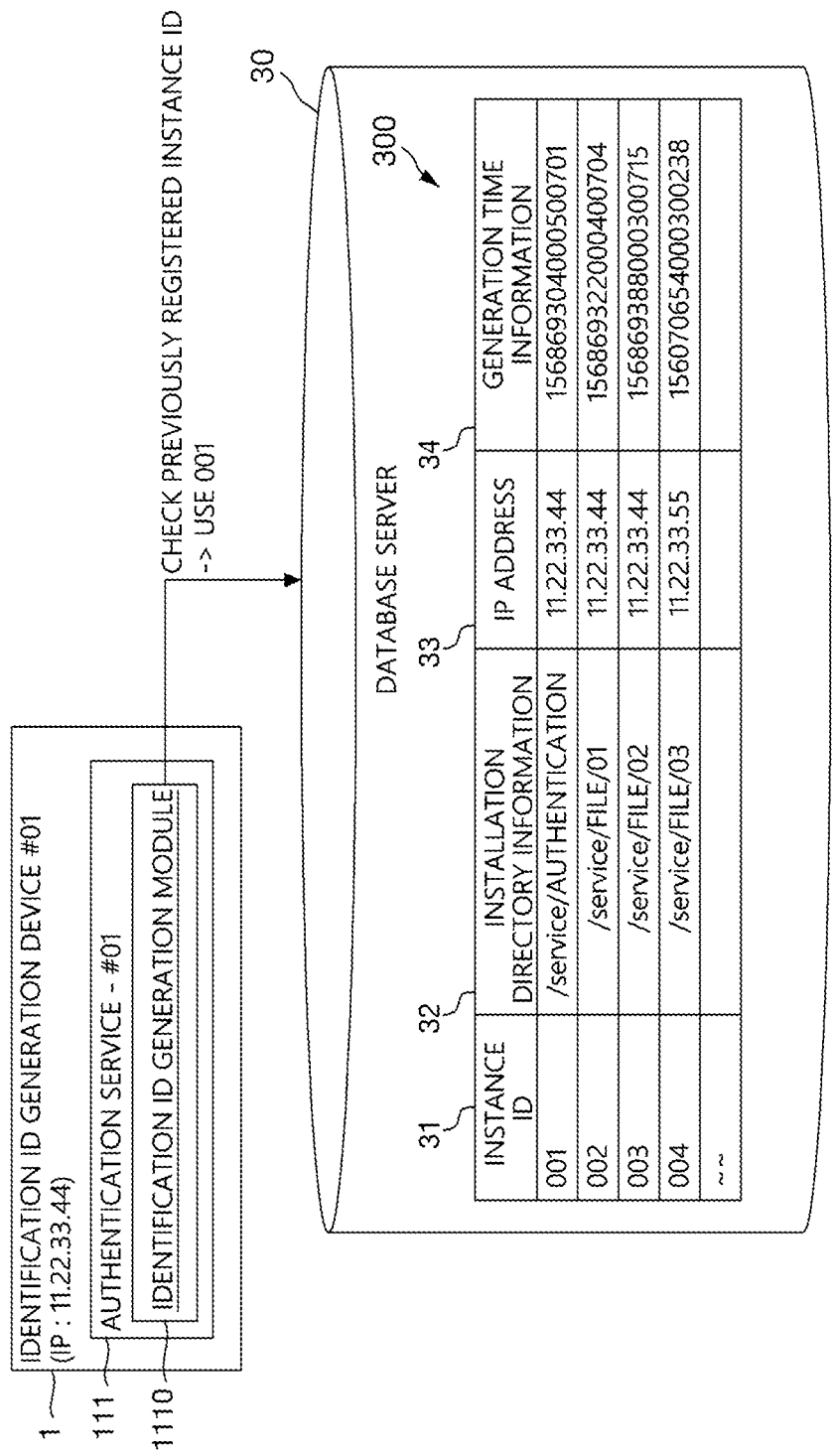
FIG. 10 is an example of using a previously registered instance ID when an instance is restarted according to some embodiments of the present invention.

FIG. 10 is an example of using a previously registered instance ID when an instance is restarted according to some embodiments of the present invention. Referring to FIG. 10, the first identification ID generation device 1 may store information about an instance ID generated when the authentication service 111 is initially started, an installation directory of the authentication service 111, an IP address, and the generated time in the instance ID 31, installation directory information 32, IP address 33, and generation time information 34 fields of the table 300 existing in the database server 30, respectively.

As an embodiment, when the authentication service 111 is restarted, the identification ID generation module 1110 may generate an identification ID using the instance ID obtained using information stored in the table 300 of the database server 30.

For example, when the authentication service 111 is restarted, it can be confirmed that the previously registered instance ID '001' exists in the table 300 of the database server 30 by using '/service/authentication,' which is the installation directory information of the authentication service 111, and '11.22.33.44,' which is the IP address. In this case, in generating an identification ID for identifying a data item generated by the authentication service 111, '001,' which is a previously registered instance ID, may be used. If the instance ID previously registered for the authentication service 111 does not exist in the table 300, a new instance ID may be generated and stored in the table 300.

Figure 11:
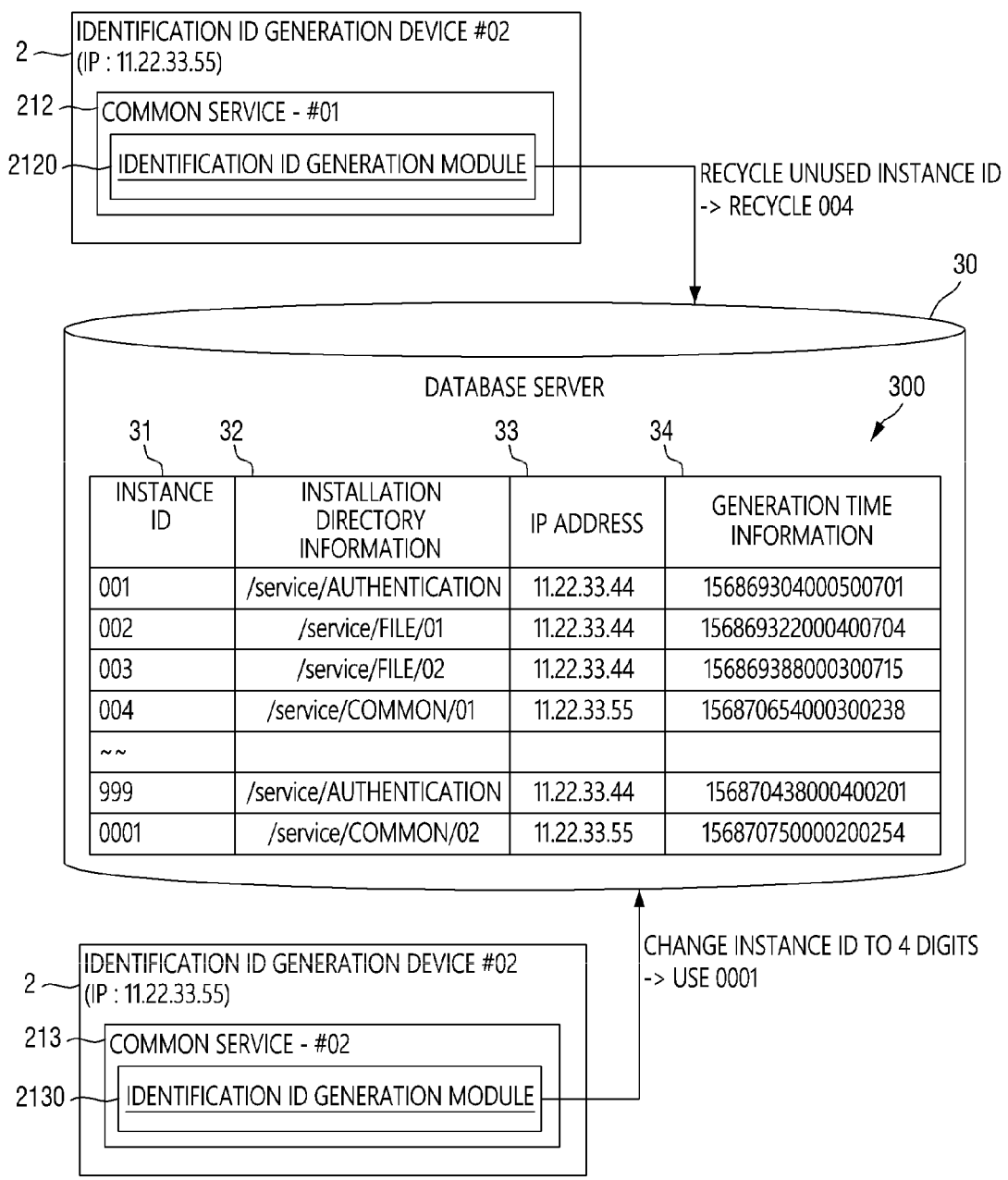
FIG. 11 is an example of recycling an instance ID or increasing the number of digits according to some embodiments of the present invention.

FIG. 11 is an example of recycling an instance ID or increasing the number of digits according to some embodiments of the present invention. Referring to FIG. 11, in generating a new instance ID when the first common service 212 is initially started, the second identification ID generation device 2 may check the generation time information corresponding to each instance ID from 001 to 999 to reuse an unused instance ID when the instance ID stored in the table 300 of the database server 30 are registered up to all of 999, which is the maximum value among three digits.

For example, among instance IDs 001 to 999, '004,' which is an instance ID, in which the generation time information has elapsed a predetermined time, is regarded as unused, and it can be used by modifying it as an instance ID of the first common service 212.

As an embodiment, in generating a new instance ID when the second common service 213 is initially started, the second identification ID generation device 2 may automatically change the number of digits of the instance ID to 4 digits when the instance ID stored in the table 300 of the database server 30 are registered up to all of 999, which is the maximum value among three digits. For example, '0001' may be registered as the instance ID of the second common service 213 by changing the number of digits of the instance ID from 3 digits to 4 digits. In this case, the identification ID may be generated by decreasing the number of digits of the sequence number from 3 digits to 2 digits as the number of digits of the instance ID is increased.

According to the embodiment of the present invention as described above, when the instance IDs used to generate the identification ID of the service instance are all used within the set number of digits, this exceptional situation can be addressed by reusing the unused ID among the previously registered instance IDs, or increasing the number of digits in the instance ID but decreasing the number of digits in the sequence number.

Figure 12:
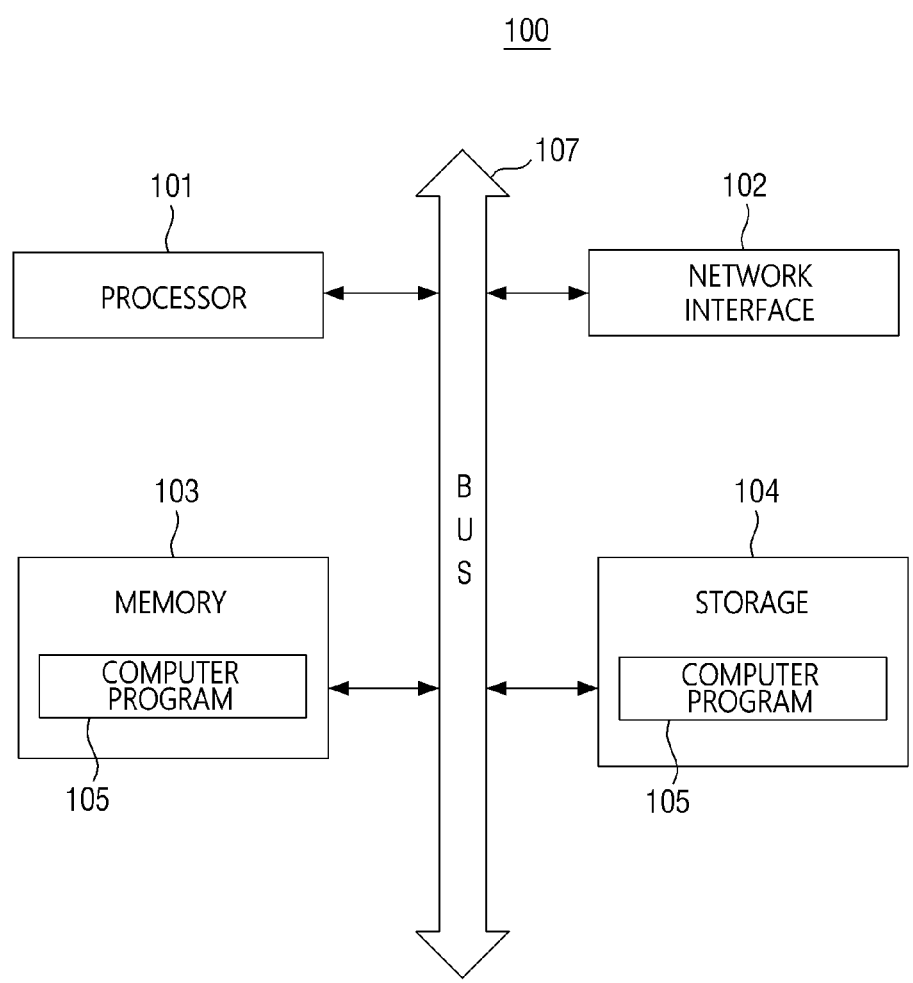
FIG. 12 is a hardware configuration diagram of an exemplary computing device that may implement methods according to some embodiments of the present invention.

FIG. 12 is a hardware configuration diagram of an exemplary computing device 100.

Referring to FIG. 12, the computing device 100 may include one or more processors 101, a bus 107, a network interface 102, a memory 103, which loads a computer program 105 executed by the processors 101, and a storage 104 for storing the computer program 105. However, FIG. 12 illustrates only the components related to the embodiment of the present disclosure. Therefore, it will be appreciated by those skilled in the art that the present disclosure may further include other general purpose components in addition to the components shown in FIG. 12.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the present disclosure. The computing device 100 may have one or more processors.

The memory 103 stores various data, instructions and/or information. The memory 103 may load one or more programs 105 from the storage 104 to execute methods/operations according to various embodiments of the present disclosure. An example of the memory 103 may be a RAM, but is not limited thereto.

The bus 107 provides communication between components of computing device 100. The bus 107 may be implemented as various types of bus such as an address bus, a data bus and a control bus.

The network interface 102 supports wired and wireless internet communication of the computing device 100. The network interface 102 may support various communication methods other than internet communication. To this end, the network interface 102 may be configured to comprise a communication module well known in the art of the present disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the present disclosure are implemented. When the computer program 105 is loaded on the memory 103, the processor 101 may perform the methods/operations in accordance with various embodiments of the present disclosure by executing the one or more instructions.

As an embodiment, the computer program 105 may include instructions for performing an operation of obtaining an instance ID for identifying each of a plurality of service instances, and an operation of generating an identification ID for identifying a data item sequentially generated by each service instance. Here, the identification ID includes an instance ID, a sequence number, and time information.

As an embodiment, the computer program 105 may further include instructions for performing an operation of generating an instance ID for identifying each service instance at the time when each of the plurality of service instances is initially started, an operation of storing the generated instance ID and generation time information in the database server 30, and an operation of storing each instance ID in an internal memory of each service instance.

As an embodiment, the operation of obtaining the instance ID may include an operation of obtaining an instance ID stored in an internal memory.

As an embodiment, the operation of storing in the database server may include an operation of storing identification information of each service instance together with the instance ID and generation time information in the database server, and the operation of obtaining the instance ID may include an operation of obtaining an instance ID stored in the database server 30 using identification information of each service instance when each service instance is restarted.

As described above, according to the computing device 100 according to an embodiment of the present invention, when generating an ID for identifying data generated by each of a plurality of service instances, it is possible to ensure uniqueness across the entire service. In addition, it is possible to ensure performance and reliability due to low dependence on the central database server when generating an ID.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A method performed by a computing device for generating an identification identifier (ID), included in a system comprising a plurality of identification ID generation devices, in which service instances are installed and executed, and a database server, the computing device being one of the plurality of identification ID generation devices, the method comprising:

generating an instance ID for identifying each of a plurality of service instances at a time when each of the plurality of service instances is initially started in the computing device;

storing, in the database server, the generated instance ID and a generation time information indicating when the instance ID is generated;

storing a respective instance ID in an internal memory of a respective service instance, wherein the respective instance ID no longer exists in the internal memory when the respective service instance is restarted;

generating an identification ID for identifying a data item sequentially generated by the respective service instance, wherein in generating the identification ID, the computing device, instead of the database server, generates a unique identification ID capable of identifying a data item generated by the respective service instance by:

obtaining, when the respective service instance is initially started in the computing device, the respective instance ID stored in the internal memory of the respective service instance and obtaining, when the respective service instance is restarted, the respective instance ID stored in the database server, and generating the identification ID that includes the obtained instance ID, a sequence number, and the generation time information; and storing the identification ID in the database server, wherein the sequence number has a second number of digits, and wherein the generating of the identification ID comprises:

increasing the generation time information by a predetermined unit time based on determination that all values expressible by the second number of digits are exhausted.

2. The method of claim 1, wherein the storing in the database server comprises:

storing identification information of the respective service instance together with the instance ID and the generation time information in the database server; and the obtaining of the respective instance ID stored in the database server comprises:

obtaining the respective instance ID stored in the database server by using the identification information of the respective service instance based on determination that the respective service instance is restarted.

3. The method of claim 2, wherein the identification information includes at least one of an IP address of a device on which the respective service instance is installed, and path information indicating a location of a directory where the respective service instance is installed.

4. The method of claim 1, further comprising:

updating the generation time information corresponding to the instance ID stored in the database server at a preset time period.

5. The method of claim 1, further comprising:

discarding an instance ID, in which a predetermined time has elapsed based on the generation time information, among instance IDs previously stored in the database server, wherein the storing in the database server comprises reusing the discarded instance ID.

6. The method of claim 1, wherein the instance ID has a first number of digits; and the method further comprises:

increasing the first number by 1 and decreasing the second number by 1 based on determination that all values expressible by the first number of digits are exhausted.

7. The method of claim 1, wherein the generation time information is a timestamp expressed by a number having preset digits.

8. A computer readable non-transitory recording medium storing a computer program for causing a computer to perform the method of claim 1.

9. An apparatus for generating an identification ID, included in a system comprising a plurality of identification ID generation devices, in which service instances are installed and executed, and a database server, the apparatus being one of the plurality of identification ID generation devices, the apparatus comprising:

a communication unit for communicating with an external device;

a storage unit; and at least one processor configured to:

generate an instance ID for identifying each of a plurality of service instances at a time when each of the plurality of service instances is initially started in the apparatus;

store, in the database server, the generated instance ID and a generation time information indicating when the instance ID is generated;

store, in the storage unit, a respective instance ID, wherein the respective instance ID no longer exists in the storage unit when the service instance is restarted;

generate an identification ID for identifying a data item sequentially generated by the respective service instance, wherein in generating the identification ID, the at least one processor of the apparatus, instead of the database server, generates a unique identification ID capable of identifying a data item generated by the respective service instance by:

obtaining, when the respective service instance is initially started in the apparatus, the respective instance ID stored in the storage unit of the respective service instance and obtaining, when the respective service instance is restarted, the respective instance ID stored in the database server, and generating the identification ID that includes the obtained instance ID, a sequence number, and the generation time information; and store the identification ID in the database server, wherein the sequence number has a second number of digits, and wherein generating of the identification ID comprises:

increasing the generation time information by a predetermined unit time based on determination that all values expressible by the second number of digits are exhausted.

10. The apparatus of claim 9, wherein the at least one processor is configured to control the communication unit to transmit identification information of the respective service instance together with the instance ID and the generation time information to the database server; and the at least one processor is configured to obtain the instance ID stored in the database server by using the identification information of the respective service instance based on determination that the respective service instance is restarted.

11. The apparatus of claim 10, wherein the identification information includes at least one of an IP address of a device on which the respective service instance is installed, and path information indicating a location of a directory where the respective service instance is installed.

12. The apparatus of claim 9, wherein the at least one processor is configured to control the communication unit to update the generation time information corresponding to the instance ID stored in the database server at a preset time period and transmit it to the database server.

13. The apparatus of claim 9, wherein the at least one processor is configured to transmit a request to discard n instance ID, in which a predetermined time has elapsed based on the generation time information, among instance IDs previously stored in the database server, and reuse the discarded instance ID.

14. The apparatus of claim 9, wherein the instance ID has a first number of digits,
   wherein the at least one processor is configured to increase the first number by 1 and decreases the second number by 1 based on determination that all values expressible by the first number of digits are exhausted.

15. The apparatus of claim 9, wherein the generation time information is a timestamp expressed by a number having preset digits.

* * * * *